United States Patent [19]

Uzumaki et al.

[11] 4,264,676
[45] Apr. 28, 1981

[54] PROCESS FOR PREPARING SUPERFINE ION-EXCHANGE FIBERS

[75] Inventors: Mitsutaka Uzumaki, Kitaoizumi; Masahiko Takashio, Fujieda; Akihisa Shirasaka, Fujieda; Tadayoshi Utsumi, Fujieda, all of Japan

[73] Assignee: Nitivy Co., Ltd., Tokyo, Japan

[21] Appl. No.: 67,489

[22] Filed: Aug. 16, 1979

[30] Foreign Application Priority Data

Aug. 16, 1978 [JP] Japan ................................ 53/99111

[51] Int. Cl.³ ................................................ D02G 3/00
[52] U.S. Cl. ......................................... 428/401; 8/115.5;
264/83; 264/185; 264/232; 264/344; 521/27;
521/29; 521/31
[58] Field of Search ....................... 428/364, 394, 401;
264/83, 232, 344, 185; 8/115.5; 521/27, 31–33,
38, 29; 525/56, 62

[56] References Cited

U.S. PATENT DOCUMENTS

| | | | |
|---|---|---|---|
| 3,097,991 | 7/1963 | Miller et al. | 428/364 |
| 3,546,063 | 12/1970 | Breen | 428/364 |
| 3,629,161 | 12/1971 | Paine et al. | 521/27 |
| 3,644,225 | 2/1972 | Quentin et al. | 521/31 |
| 3,741,945 | 6/1973 | Bourat et al. | 521/27 |
| 3,770,666 | 11/1973 | Bourat et al. | 521/27 |

FOREIGN PATENT DOCUMENTS

| | | | |
|---|---|---|---|
| 41-9135 | 5/1966 | Japan | 264/185 |
| 51-38526 | 3/1976 | Japan | 264/185 |
| 53-4787 | 1/1978 | Japan | 264/185 |
| 54-30930 | 3/1979 | Japan | 264/185 |
| 54-77720 | 6/1979 | Japan | 264/185 |
| 574488 | 1/1978 | U.S.S.R. | 264/185 |

Primary Examiner—Jay H. Woo
Attorney, Agent, or Firm—Sughrue, Rothwell, Mion, Zinn and Macpeak

[57] ABSTRACT

Superfine fibers of polyvinyl alcohol type having a single fiber diameter of 0.1–1.0μ and a fineness of 0.8–80×10⁻⁴d/f are baked in the presence of a dehydration catalyst so that the weight loss ratio of fibers falls under the range of about 5 to 40%.

When ion-exchange radicals are introduced into the partially dehydrated fiber, superfine fibers with a high ion-exchange rate are obtained.

7 Claims, 3 Drawing Figures

PROCESS FOR PREPARING SUPERFINE ION-EXCHANGE FIBERS

BACKGROUND OF THE INVENTION

This invention relates to superfine fibers with a high ion-exchange capacity, obtained from a polyvinyl alcohol type fiber (hereinafter referred to as PVA fiber).

Since an ion-exchange reaction relies on a contact reaction between radicals of an ion-exchanger and substrates to be ion-exchanged, the more chances of both contacting, the higher a reaction rate. Therefore the larger a surface area of ion-exchangers and the more radicals present on the surface, the faster an ion-exchange reaction. Ion-exchange resins in the form of particles are in general used as materials having an ion-exchange capacity. The particulate ion-exchange resins, however, have a disadvantage that the ion-exchange velocity is low because of a small surface area.

For overcoming the disadvantage porous resins were provided, but the effects of having increased the surface area were not substantially attained in that openings of the porous resin are blocked and reaction products are not conveniently recycled in the openings. Fine powders obtained by pulverization of particulate resins had some effects, though the handling was difficult because of a particle size being too small.

For overcoming such disadvantages processes for the preparation of ion-exchange fibers were disclosed, for example, in Japanese Patent Publication No. 51-44712, Japanese Patent Application Kokai Nos. 51-38526 and 53-4787. These ion-exchange fibers exhibit good properties having 10–20 times the exchange velocity as compared with the conventional ion-exchange resins. On the other hand, fibers obtained by conventional spinning conditions have a diameter of 10–30μ and making the fiber diameter smaller is desired for increasing the fiber surface area. However, with conventional spinning methods about 10μ in diameter is the lower limit and spinning fibers of smaller diameter is very difficult from the points of filament's breaking and its handling.

SUMMARY OF THE INVENTION

An object of this invention is to provide superfine ion-exchange fibers of 0.1–1.0μ in diameter having a high ion-exchange velocity.

Another object of this invention is to provide superfine ion-exchange fibers having good performances such as chemical resistance and heat resistance and high ion-exchange capacity.

In accordance with this invention, there is provided a process for the preparation of superfine fibers with ion-exchange capacity which comprises baking superfine fibers of polyvinyl alcohol type having a single fiber diameter of 0.1–1.0μ and a fineness of $0.8-80\times10^{-4}$ d/f at temperatures of about 80°–350° C. in the presence of a catalyst for dehydration of polyvinyl alcohol so that weight loss ratio of fibers falls under the range of about 5–40% and introducing an ion-exchange radical into the fibers thus obtained.

DETAILED DESCRIPTION OF THE INVENTION

Figure 1:
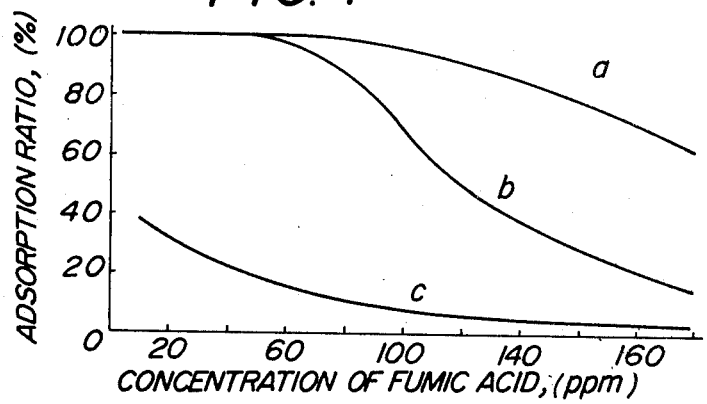
FIG. 1 is a graph showing an absorption performance to humic acid of superfine ion-exchange fibers according to this invention and controls.

Superfine PVA fibers which may be used in this invention are prepared in accordance with the process disclosed in Japanese Patent Applications No. 52-93371 (Application Kokai No. 54-30930) and No. 52-143270 (Application Kokai No. 54-77720). Namely, an aqueous solution of PVA and an aqueous solution of a water-soluble, non-crystalline polymer are mixed together in a weight ratio of solid content of 20:80–60:40 to make a spinning solution and subjected to a dry spinning in conventional methods, followed by drawing and heat treatment. Thereafter, by washing the thus obtained filaments with water the non-crystalline polymers are extracted and removed whereby superfine fibers are obtained. Herein, the water-soluble, non-crystalline polymer includes, for example, polyethylene oxide of 3,000–4,000,000 in molecular weight and a low-saponified PVA of 500–2,000 in average polymerization degree and of 83–93% by mole in saponification value. These polymers are hardly crystallized during the drawing and heat treatment step for formation of filaments and therefore, can be easily extracted and removed by subsequest washing with water.

When the proportion of the non-crystalline polymer exceeds 80% by weight, polymers to be removed by the washing with water increase in quantity, which is undesirable economically. On the other hand, with less than 40% by weight it is difficult to make fibers superfine by the washing treatment and a mechanical beating treatment is required.

PVA used herein as the starting material means one having an average polymerization degree of 800–3,000 and a saponification value of more than about 95 mol %. When the polymerization degree is too low, fibers with poor quality are obtained. On the other hand, when the polymerization degree is too high, the viscosity of spinning solution is increased so that the handling becomes difficult. Further, when the saponification value is less than about 95 mol %, the effect of retarding crystallization is increased and therefore, a sufficient resistance towards heated water is not rendered in the drawing and heat treatment step. Also, a saponification of the remaining acetic acid groups slowly advances during preservation of the spinning solution so that its property changes with the lapse of time. Accordingly, PVA having an average polymerization degree of 1,000–2,000 and a saponification value of 99 mol % or more is preferred.

Further, a modified PVA mainly comprising PVA may be also used. The modified PVA is prepared by introducing —COOH, —SO$_3$H, —NH$_2$, —N(CH$_3$)$_2$ and others with use of copolymerization, acetalation, etherification or esterification methods, for example, by saponifying copolymers of vinyl acetate and maleic anhydride, vinyl acetate and acrylic acid, vinyl acetate and allylsulfonic acid, vinyl acetate and acryl amide and so forth or by effecting a partial formalation, acetalation or aminoacetalation of conventional PVA. Since the modification degree varies depending on introducing at random or in block, it cannot be primarily defined, although it is required that the modified PVA is not at all extracted when removing polyethylene oxide by washing or its loss owing to extracting is little. Depending on the resistance towards heated water the modified PVA may be used alone or in mixture with the conventional PVA.

A catalyst for dehydration of PVA has an effect of accelerating a dehydration reaction in baking of PVA. Examples of the catalyst include polyphosphoric acid ammonium represented by the formula,

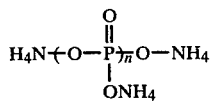

wherein n is an integer of 10-400, phosphoric acid, phosphoric acid ammonium salts and gaseous hydrogen chloride. The dehydration catalyst may be involved in fibers by preliminarily adding to the spinning solution or dipping superfine fibers in an aqueous solution of the above catalyst and used in an amount of 3-15%, preferably 5-10% by weight of the PVA fiber. In case of having the catalyst involved in fibers, the baking is conducted in air, in atmosphere of inert gas or in vacuum and preferably, in air. Also, some catalysts may be allowed to exist in atmosphere during the baking and therefor, gaseous hydrogen chloride or gaseous mixture thereof with inert gas are used.

It is essential that the baking is effected to such a degree that the weight loss ratio of superfine PVA fibers falls under the range of about 5-40%. Since heating conditions for the baking will vary depending on whether the dehydration catalyst is involved in fibers or not and also, on atmosphere of the heating, they are not primarily defined, although the baking is effected at temperatures of about 80°-350° C. for about 10-180 minutes to obtain superfine fibers of about 5-40% in weight loss ratio.

Thus, black or black-brown fibers are obtained, which have a partially polyenized structure. It has been confirmed from the elementary analysis that the weight loss ratio in the baking is substantially due to dehydration reaction only and splitting of low molecular organic compounds takes place slightly in case of a large weight loss ratio.

The structure of the partially polyenized fiber should be characterized by a degree of polyenization or conversion ratio of vinyl alcohol units to polyene structure units, but since the molecular structure of PVA used as the starting material is not uniform, it is difficult to define exactly the partially polyenized PVA by the degree of polyenization.

In this invention, therefore, the definition by the weight loss ratio as indicated hereunder is used:

Weight loss ratio = $(A - B/A) \times 100$ (%)
A: Sample weight before dehydration
B: Sample weight after dehydration If the weight loss ratio is less than 5%, fibers suffer a remarkable swell and degradation during chemical reaction for the introduction of ion-exchange radicals, while with more than 40% the reactivity is reduced so that fibers with a high ion-exchange capacity cannot be obtained. It should be noticed that the range of weight loss ratio is selected depending on type of the chemical reaction for introducing ion-exchange radicals. For example, for preparing a strongly acidic cation exchange fiber there are a reaction for adding sulfuric acid to the polyene structure of fibers and a sulfation reaction with hydroxyl groups of the remaining vinyl alcohol units.

For the former the weight loss ratio of 20-40%, preferably 25-35% is desirable, while for the latter the weight loss ratio of 5-25%, preferably 10-20% is desirable. Since the sulfuric acid addition reaction is conducted by a concentrated sulfuric acid of more than 98%, with weight loss ratio of less than 20% fibers suffer a remarkable swell and degradation during the reaction.

On the other hand, the sulfation reaction is conducted in sulfuric acid of 80-100% in concentration in the presence of sulfates of from a 10% concentration to its saturation concentration as a swell inhibiting agent.

The esterification with hydroxyl groups of the remaining vinyl alcohol units is effected while inhibiting the sulfuric acid addition reaction to the polyene units. Accordingly, when the weight loss ratio is more than 25%, the remaining hydroxyl groups are reduced in quantity so that occurrence of the reaction is difficult and thus, fibers with poor ion-exchange capacity are only obtained. It is assumed that the weight loss ratio of 5-25% corresponds approximately to the degree of polyenization of 10-65 mol %.

The partially polyenized fibers thus obtained hardly swell in boiling water and have good resistance toward acid and alkali solutions and other chemicals, and are superior in durability.

Next, ion-exchange radicals are introduced into the partially polyenized, superfine fibers. As mentioned above, the introduction of strongly acidic cation-exchange radicals is conducted in a concentrated sulfuric acid bath in the presence of or absence of a swell inhibiting agent of from a 10% concentration to its saturation concentration at temperatures of 10°-100° C. Though the reaction time is suitably decided depending on the reaction temperature, it is usually more than two minutes. Weakly acidic cation-exchange radicals are introduced by effecting Diels-Alder's reaction with maleic anhydride or acrylic acid, followed by hydrolyzing with an alkali.

Strongly basic anion-exchange radicals are introduced, for example, by effecting reaction with epichlorohydrine, followed by amination with trimethylamine. Also, weakly basic anion-exchange radicals are introduced, for example, by effecting a graft polymerization of ethyleneimine.

A reaction velocity of introduction of ion-exchange radicals into the partially polyenized superfine fibers is remarkably rapid as compared with that into fibers with conventional fineness (3 d, diameter 18μ). For example, in case PVA fibers baked in atmosphere of gaseous hydrogen chloride are subject to a sulfation reaction in a sulfuric acid bath containing ammonium sulfate, the superfine fibers reach approximately an equilibrium value 3-5 minutes after commencement of the reaction, while it takes 50-60 minutes for the conventional fineness fibers. Further, in case of the superfine fibers the degree of deterioration of quality caused by the introduction reaction is amall, probably because of the reaction occurring mainly on the surface of fibers.

When the reaction time is prolonged to 50-60 minutes, the equilibrium value hardly changes, though the deterioration of quality is increased to the same grade as that of the conventional fineness fibers.

Fineness of the superfine, ion-exchange fibers according to this invention is somewhat increased during the ion-exchange radical introducing reaction, though they exhibit about the same level as fineness of the starting fibers and have a remarkably increased surface area and also, are extremely superior to ion-exchange fibers with the conventional fineness in an ion-exchange velocity and an adsorption of macromolecule ions.

This invention will be illustrated by the following Examples. Parts are by weight.

Example of Preparation of Superfine Fibers:

100 parts of an aqueous solution of a 30% concentration of polyethylene oxide having an average molecular weight of 300,000–500,000 were added to 83 parts of an aqueous solution of a 36% concentration of PVA which was prepared from a perfectly saponified PVA of 1,200 in average polymerization degree. Stirring was effected under heating to form a spinning solution having a solid content of 32.8% and a polyethylene oxide content of 50%.

The spinning solution was subject to dry spinning in conventional conditions, drawn eight times and heat-treated at 235° C. Thus, filaments of 120d/30f in fineness, 5.8 g/d in strength, 15.5% in elongation and 94° C. in softening point in water were obtained. When the filaments were washed with water at normal temperature for 10 minutes, polyethylene oxide was extracted into water whereby continuous superfine PVA fibers of 0.6–0.8μ in diameter were obtained.

In the same procedure as the above superfine fibers of 0.1–1.0μ in diameter were obtained varying the proportion of polyethylene oxide.

EXAMPLE 1

Polyphosphoric acid ammonium in an amount of 5% by weight of PVA was added to a spinning solution and after spinning, polyethylene oxide, one of the fiber forming components was removed by extraction with methanol whereby superfine PVA fibers of 0.1μ in diameter and $0.8 \times 10^{-4}$ d/f in fineness were obtained.

In this Example, since polyphosphoric acid ammonium is water-soluble, the extraction with methanol was effected instead of the water-washing after spinning in the above-mentioned Preparation Example of superfine fibers. The superfine fibers obtained were baked at 130° C. in air for 50 minutes to obtain partially polyenized fibers of 5% in weight loss ratio.

Next, the fibers were dipped in a 32% sulfuric acid at room temperature for an hour and after drying, dipped in epichlorohydrine at 50° C. for three hours to obtain fibers having an etherification degree of 16 mol %. Further, amination was conducted using trimethyl amine of 20% and an aqueous solution of saturated sodium sulfate at 50° C. for three hours. Strongly basic anion-exchange fibers having a salt-splitting capacity of 1.2 meq./g were obtained.

For control, PVA fibers of 3 d/f in fineness and 18μ in diameter containing 5% of polyphosphoric acid ammonium were baked to form partially polyenized fibers having a weight loss ratio of 5%. Then, the same introduction reaction as the above was conducted.

Properties of the ion-exchange fibers obtained are given in Table 1. Fineness is calculated as average diameter from photographs by electron microscope. Similarly, the surface area is a calculated value.

TABLE 1

| Samples | Fineness of fibers before reaction, d/f | Fineness of ion-exchange fibers, d/f | Surface area of fibers m²/g | Salt-splitting capacity meq./g |
|---|---|---|---|---|
| This Invention | $0.8 \times 10^{-4}$ | $1.5 \times 10^{-4}$ | 24 | 1.5 |
| Control | 3.0 | 5.6 | 0.13 | 1.4 |

In addition to the above two samples, a commercial available ion-exchange resin, Amberlite IRA 410 was used for Reference sample. The samples were made a free type and dipped in a bath of humic acid solution with various concentrations (bath ratio, 1:100) at normal temperature for an hour while vibrating and stirring. An adsorption performance to humic acid was obtained from changes in the bath concentration.

The results are set forth in FIG. 1, from which it is clear that the adsorption performance is in ranking of this invention's sample (Curve a)>Control sample (Curve b)>Reference sample (Curve c) and this invention is exceedingly superior to the others.

EXAMPLE 2

A baked fiber of 17% in dehydration weight loss ratio was obtained by baking superfine PVA fibers in atmosphere of hydrogen chloride while elevating the temperature from 60° C. to 130° C. at a rate of 100° C./hr and maintaining the temperature of 130° C. for 30 minutes.

Next, the fibers were dipped in a bath comprising 25% of ammonium sulfate and 75% of sulfuric acid and sulfation reaction was effected at normal temperature for ten minutes. After washing with water and neutralizing, strongly acidic cation-exchange fibers of a sulfuric ester type were obtained.

For control sample, PVA fibers with conventional fineness were baked at 130° C. for 60 minutes and then, sulfation reaction was effected in the above bath at normal temperature for 60 minutes.

Performances of ion-exchange fibers obtained are set forth in Table 2.

TABLE 2

| Samples | Fineness of fibers before reaction, d/g | Fineness of ion-exchange fibers, d/f | Surface area of fibers m²/g | Salt-splitting capacity meq./g |
|---|---|---|---|---|
| This Invention | $1.5 \times 10^{-4}$ | $3.0 \times 10^{-4}$ | 17 | 3.7 |
| Control | 3.0 | 6.1 | 0.12 | 3.6 |

In addition to the above two samples, a commercially available ion-exchange resin, Amberlist 15 was used for Reference sample. 1.0 g (dry weight) of each of the samples was made sodium type by a column operation and poured into a bath of calcium chloride equivalent to the capacity, to which deionized water had preliminarily added to make a 1.01 solution, while stirring the solution at a fixed speed. 20 ml were sampled from the bath every indicated time and an amount of the remaining calcium ion was measured by a chelatometric titration with EDTA solution using Eriochrome Black T as an indicator. Ion-exchange rates were obtained from the ratio to the original bath.

Figure 2:
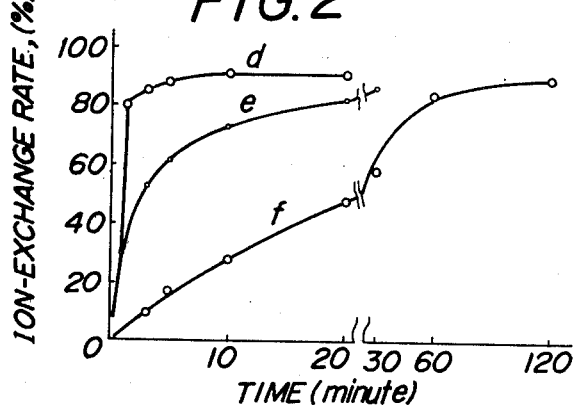
FIG. 2 is a graph showing an ion-exchange rate of superfine ion-exchange fibers according to this invention and controls.

The results are set forth in FIG. 2 from which it is clear that the ion-exchange rate is in ranking of this invention's sample (Curve d)>Control sample (Curve e)>Reference sample (Curve f) and the exchange rate of this invention is most rapid.

EXAMPLE 3

5% by weight of polyphosphoric acid ammonium on the basis of weight of PVA were added to a spinning solution and after spinning, one of the fiber forming components, polyethylene oxide was removed by extraction with methanol. Superfine PVA fibers thus obtained were baked in air at 190° C. for an hour to obtain baked fibers of 16% in dehydration weight loss ratio. Said fibers were dipped in a bath comprising a 10 vol.% of ethylene imine in xylene (bath ratio, 1:20) and refluxed for 10 hours. After washing of the reaction products, weakly basic anion-exchange fibers were obtained.

For control, PVA fibers with conventional fineness were used, which were obtained by adding 5% by weight of polyphosphoric acid ammonium based on PVA to a spinning solution and spinning.

Said fibers were baked in air at 190° C. for 1.5 hours to obtain fibers of 16% in weight loss ratio and thereafter, the same introduction reaction as the above was effected.

Performances of the ion-exchange fibers thus obtained are set forth in Table 3.

TABLE 3

| Samples | Fineness of fibers before reaction, d/f | Fineness of ion-exchange fibers, d/f | Surface area of fibers $m^2/g$ | Total anion-exchange capacity meq./g |
|---|---|---|---|---|
| This Invention | $1.1 \times 10^{-4}$ | $3.7 \times 10^{-4}$ | 15 | 8.4 |
| Control | 2.8 | 9.5 | 0.096 | 8.5 |

In addition to the above two samples, a commercially available ion-exchange resin, Duolite S-37 was used for Reference sample. The two ion-exchange fibers were cut to 1–2 mm long and filled in 10 mm thickness in a column of 20 mm in diameter and the ion-exchange resin filled in 20 mm thickness.

A 1/10 N hydrochloric acid was charged into the column which was then washed sufficiently with deionized water. When a pH of the resulting solution was made 3–4, a 20 ppm solution of acidic dye, Suminol Milling Red RS (C.I. Acid Red 99) was charged at a flow rate of 60 ml/min. and a dye concentration in the passing solution was observed.

Figure 3:
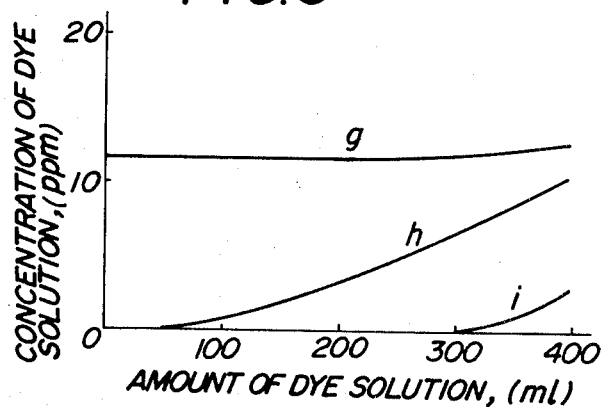
FIG. 3 is a graph showing a dye adsorption performance of superfine ion-exchange fibers according to this invention and controls.

The results are set forth in FIG. 3, from which it is clear that the dye adsorption performance is in ranking of this invention (Curve i)>Control (Curve h)>Reference>(Curve g).

EXAMPLE 4

Superfine fibers containing polyphosphoric acid ammonium, which were used in Example 3 were baked at 190° C. in a nitrogen atmosphere for three hours to form dehydrated fibers of 27% in weight loss ratio. The fibers obtained were dipped in a 98% sulfuric acid and sulfonation reaction was effected at 60° C. for three hours whereby strongly acidic cation-exchange fibers of a sulfonic acid type were obtained.

For control, using PVA fibers with conventional fineness containing polyphosphoric acid ammonium, which were used in Example 3, sulfonation reaction was effected in the same manner as the above except conducting the reaction for 6 hours.

Performances of the ion-exchange fibers obtained are set forth in Table 4.

TABLE 4

| Samples | Fineness of fibers before reaction, d/f | Fineness of ion-exchange fibers, d/f | Surface area of fibers $m^2/g$ | Salt-splitting capacity meq./g |
|---|---|---|---|---|
| This Invention | $1.1 \times 10^{-4}$ | $2.1 \times 10^{-4}$ | 21 | 2.1 |
| Control | 2.8 | 5.4 | 0.13 | 2.1 |

In addition to the above two samples, commercially available ion-exchange resin, Amberlite IR 120 B was used for a Reference sample. The samples were made copper type by passing an aqueous solution of copper sulfate in a column operation.

After drying the two ion-exchange fibers were cut to 1–2 mm long and filled in 2 cm thickness in a pipe of 1.0 cm in diameter and the ion-exchange resin filled in 2 cm thickness. A gaseous mixture of ammonia (concentration 5%) and air was passed through the pipe at a flow rate of 2 l/min. and the ratio of an amount of ammonia absorbed to a salt-splitting capacity was measured after the indicated time. The results are given in Table 5. Also, the amount of adsorption equilibrium was 1.9–2.0.

TABLE 5

| Samples | After one minute | After five minutes |
|---|---|---|
| This Invention | 1.5 | 1.9 |
| Control | 0.7 | 1.5 |
| Reference | 0.1 | 0.4 |

It is apparent from Table 5 that this invention is superior to the others.

EXAMPLE 5

Using the baked superfine fibers obtained in Example 2, Diels-Alder's reaction was effected with maleic anhydride at 160° C. for an hour and then, hydrolysis was effected with a 1/10 N sodium hydroxide solution whereby weakly acidic cation-exchange fibers were obtained.

For control, the conventional fineness fibers were treated in the same manner as the above except effecting the reaction at 160° C. for 5 hours.

Performances of the ion-exchange fibers obtained are set forth in Table 6.

TABLE 6

| Samples | Fineness of fibers before reaction, d/f | Fineness of ion-exchange fibers, d/f | Surface area of fibers $m^2/g$ | Total cation-exchange capacity meq./g |
|---|---|---|---|---|
| This Invention | $1.5 \times 10^{-4}$ | $3.4 \times 10^{-4}$ | 16 | 4.8 |
| Control | 3.0 | 6.9 | 0.11 | 4.8 |

In addition to the above two samples, a commercially available ion-exchange resin, Amberlite IRC 50 was used for a Reference sample. A 1/10 N hydrochloric acid was charged into a column, which was then washed sufficiently with deionized water till a pH of the resulting solution had reached neutralization and dried.

The two ion-exchange fibers were cut to 1–2 mm long and filled in 2 cm thickness in a pipe of 1.0 cm in diameter and the ion-exchange resin filled in 2 cm thickness.

Air containing 50 ppm of dimethylamine was passed through at a flow rate of 2 l/min. and an amine concentration in air was measured. The results are set forth in Table 7.

TABLE 7

| Samples | Lapsed Time | |
|---|---|---|
| | One minute | Five minutes |
| This Invention | 0–3 ppm | 0–3 ppm |
| Control | 7–10 | 8–10 |
| Reference | 45–50 | 45–50 |

The above Table shows that this invention is superior to the others.

What is claimed is:

1. A process for preparing superfine fibers with ion-exchange capacity which comprises baking superfine fibers of a polyvinyl alcohol type having a single fiber diameter of $0.1$–$1.0\mu$ and a fineness of $0.8$–$80\times10^{-4}$ d/f in the presence of a dehydration catalyst at temperatures of about 80°–350° C. so that a weight loss ratio of fibers falls within the range of about 5–40% and introducing an ion-exchange radical into the baked fibers.

2. The process of claim 1 wherein the dehydration catalyst is ammonium polyphosphate, phosphoric acid, ammonium phosphate salts and hydrogen chloride.

3. The process of claim 1 wherein said baking is effected in air, in an atmosphere of an inert gas or in a vacuum under the condition of having the dehydration catalyst involved in fibers.

4. The process of claim 1 wherein said baking is effected in an atmosphere of a gaseous hydrogen chloride or gaseous mixture of hydrogen chloride with an inert gas.

5. The process of claim 1 wherein said weight loss ratio of fibers falls within the range of about 5–25% and sulfuric ester radicals are introduced by a sulfation reaction with hydroxyl groups of the remaining vinyl alcohol units.

6. The process of claim 1 wherein said weight loss ratio of fibers falls within the range of about 20–40% and sulfonic acid radicals are introduced.

7. Superfine fibers of a polyvinyl alcohol type having a single fiber diameter of $0.1$–$1.0\mu$ and a fineness of $0.8$–$80\times10^{-4}$ d/f, prepared according to the process of claim 1.

* * * * *